(12) United States Patent
Rikihisa (10) Patent No.: US 7,553,356 B2
(45) Date of Patent: Jun. 30, 2009

(54) EXHAUST GAS SCRUBBER FOR EPITAXIAL WAFER MANUFACTURING DEVICE

(75) Inventor: Yasuhiro Rikihisa, Kishima-gun (JP)

(73) Assignee: Sumco Corporation, Tokyo (JP)

( * ) Notice: Subject to any disclaimer, the term of this patent is extended or adjusted under 35 U.S.C. 154(b) by 677 days.

(21) Appl. No.: 11/245,212

(22) Filed: Oct. 7, 2005

(65) Prior Publication Data

US 2006/0075897 A1     Apr. 13, 2006

(30) Foreign Application Priority Data

Oct. 12, 2004    (JP)   ............................... 2004-297531

(51) Int. Cl.
*B01D 47/00* (2006.01)

(52) U.S. Cl. ............................. 96/271; 96/277; 96/322; 95/216; 95/224; 261/114.1; 261/115; 261/116; 261/117; 261/118; 261/DIG. 54

(58) Field of Classification Search .................. 95/216, 95/224; 96/322, 323, 270–277; 261/DIG. 54, 261/114–118
See application file for complete search history.

(56) References Cited

FOREIGN PATENT DOCUMENTS

| | | | |
|---|---|---|---|
| JP | 63-1620 U | | 1/1988 |
| JP | 09-186093 | * | 7/1997 |
| JP | 2001-007034 | | 1/2001 |
| JP | 11-333267 | * | 6/2001 |
| JP | 2001-149822 | | 6/2001 |
| JP | 2003-260333 | | 9/2003 |

OTHER PUBLICATIONS

Japanese Office Action dated Aug. 5, 2008 for Appln. No. 2004-297531.

* cited by examiner

*Primary Examiner*—Duane Smith
*Assistant Examiner*—Ives Wu
(74) *Attorney, Agent, or Firm*—Pillsbury Winthrop Shaw Pittman, LLP (57) ABSTRACT

This exhaust gas scrubber for an epitaxial wafer manufacturing device includes: a scrubber inlet tube for introducing an exhaust gas discharged from an epitaxial wafer manufacturing device; and a wash tube unit formed inside the scrubber inlet tube for spraying wash water toward an interior of the scrubber inlet tube from one end thereof so as to wash adhesions inside the scrubber inlet tube, wherein the wash tube unit includes an outer tube through which inert gas constantly flows, a middle tube which is formed inside the outer tube and through which inert gas intermittently flows, and an inner tube which is formed inside the middle tube and through which the wash water and inert gas alternately flow.

4 Claims, 8 Drawing Sheets

EXHAUST GAS SCRUBBER FOR EPITAXIAL WAFER MANUFACTURING DEVICE

BACKGROUND OF THE INVENTION

1. Field of the Invention

This invention relates to an exhaust gas scrubber for an epitaxial wafer manufacturing device which captures and separates exhaust gas components produced by an epitaxial wafer manufacturing device so as to purify an exhaust gas.

This application claims priority from Japanese Patent Application No. 2004-297531 filed on Oct. 12, 2004, the content of which is incorporated herein by reference.

2. Background Art

A device for manufacturing silicon epitaxial wafers which are used as substrates for semiconductor devices and the like produces chlorine exhaust gas including $SiHCl_3$ gas necessary for epitaxial growth.

This type of chlorine exhaust gas is strongly corrosive, and cannot be released into an atmosphere directly. Therefore, $SiHCl_3$ components in the exhaust gas are captured by an exhaust gas scrubber so as to purify the exhaust gas, and then the exhaust gas is released.

This exhaust gas scrubber, for example, purifies the exhaust gas by passing it through an atmosphere in which wash water such as water is sprayed, resulting in capture and removal of noxious components in the exhaust gas.

With regard to this exhaust gas scrubber, in a step of bringing the exhaust gas into contact with the wash water, it frequently happens that the exhaust gas components chemically react with the wash water to generate a product and the product adheres to and accumulates on a contact portion of a nozzle or the like which sprays the exhaust gas into a wash water atmosphere.

When such a product is left to accumulate, it causes a degradation in efficiency for purifying the exhaust gas and a clogging of the nozzle or the like which sprays the exhaust gas. Therefore, it is necessary to conduct periodic cleaning and removal of deposits. As a means for removing the deposits produced in the step of bringing the exhaust gas into contact with the wash water, for example, a method for purifying an exhaust gas is disclosed in Patent Document 1 in which deposits accumulated inside an inlet tube are mechanically scraped out by a rod or the like from outside the tube so as to remove the deposits. Also, a wafer manufacturing device is disclosed in Patent Document 2 in which deposits adhered on a inlet tube are removed by means of a deposit-scraping member formed to be freely movable in a longitudinal direction of the inlet tube.

However, in the aforementioned method for purifying an exhaust gas and a device therefor disclosed in Patent Document 1 and 2, the deposits (product) produced inside the tube are mechanically removed by a manual operation, and time is required for this removal, during which the manufacturing device including an exhaust gas device must be stopped, thereby productivity is impeded. Moreover, since these are methods for removing the deposits by a manual operation, in the case in which an amount of deposits is large, much labor is required and it may be impossible to completely remove the deposits. Furthermore, in the case in which, for example, the exhaust gas components react with the wash water to produce combustible deposits or the like, removal of the deposits by a manual operation involves serious concerns from the safety standpoint. Moreover, it is necessary to conduct cleaning at a frequency of once every 2 or 3 days for the purposes of removing deposits from the exhaust gas scrubber, and on each occasion, the epitaxial wafer manufacturing device and the exhaust gas scrubber must be stopped to conduct the work of cleaning, which constitutes a factor reducing an operating efficiency of the device, and thus reducing productivity.

(Patent Document 1) Japanese Unexamined Patent Application, First Publication No. H09-186093

(Patent Document 2) Japanese Patent Application, First Publication No. 2001-7034

SUMMARY OF THE INVENTION

The present invention was made in light of the aforementioned circumstances for the purpose of providing an exhaust gas scrubber for an epitaxial wafer manufacturing device which enables safe and efficient removal of deposits produced in a process of bringing exhaust gas into contact with wash water, without lowering an operating efficiency of the device.

In order to achieve the aforementioned object, the exhaust gas scrubber for an epitaxial wafer manufacturing device of the present invention includes: a scrubber inlet tube for introducing an exhaust gas discharged from an epitaxial wafer manufacturing device; and a wash tube unit formed inside the scrubber inlet tube for spraying wash water toward an interior of the scrubber inlet tube from one end thereof so as to wash adhesions inside the scrubber inlet tube, wherein the wash tube unit includes an outer tube through which an inert gas constantly flows, a middle tube which is formed inside the outer tube and through which an inert gas intermittently flows, and an inner tube which is formed inside the middle tube and through which the wash water and inert gas alternately flow.

Joints may be further formed in the outer tube, the middle tube and the inner tube configuring the wash tube unit so as to prevent variation in their mutual installation spacing. Also, the wash tube unit may spray the wash water toward the interior of the scrubber inlet tube at an angular range of 15 to 25° relative to a longitudinal direction thereof.

According to the exhaust gas scrubber for an epitaxial wafer manufacturing device of the present invention, deposits accumulated in the scrubber inlet tube are removed by spraying the inert gas and wash water towards an inner wall of the scrubber inlet tube from the triple-structured wash tube unit. By removing the deposits of exhaust gas components from the epitaxial wafer manufacturing device, in the scrubber inlet tube of the exhaust gas scrubber, reductions in exhaust-gas purifying performance caused by excessive accumulation of deposits can be prevented.

Furthermore, by automatically and regularly conducting this cleaning of the scrubber inlet tube at a timing different from the epitaxial growth process, it is possible to remove the deposits safely without reduction in the productivity of the epitaxial wafer manufacturing device.

PREFERRED EMBODIMENTS

Figure 1:
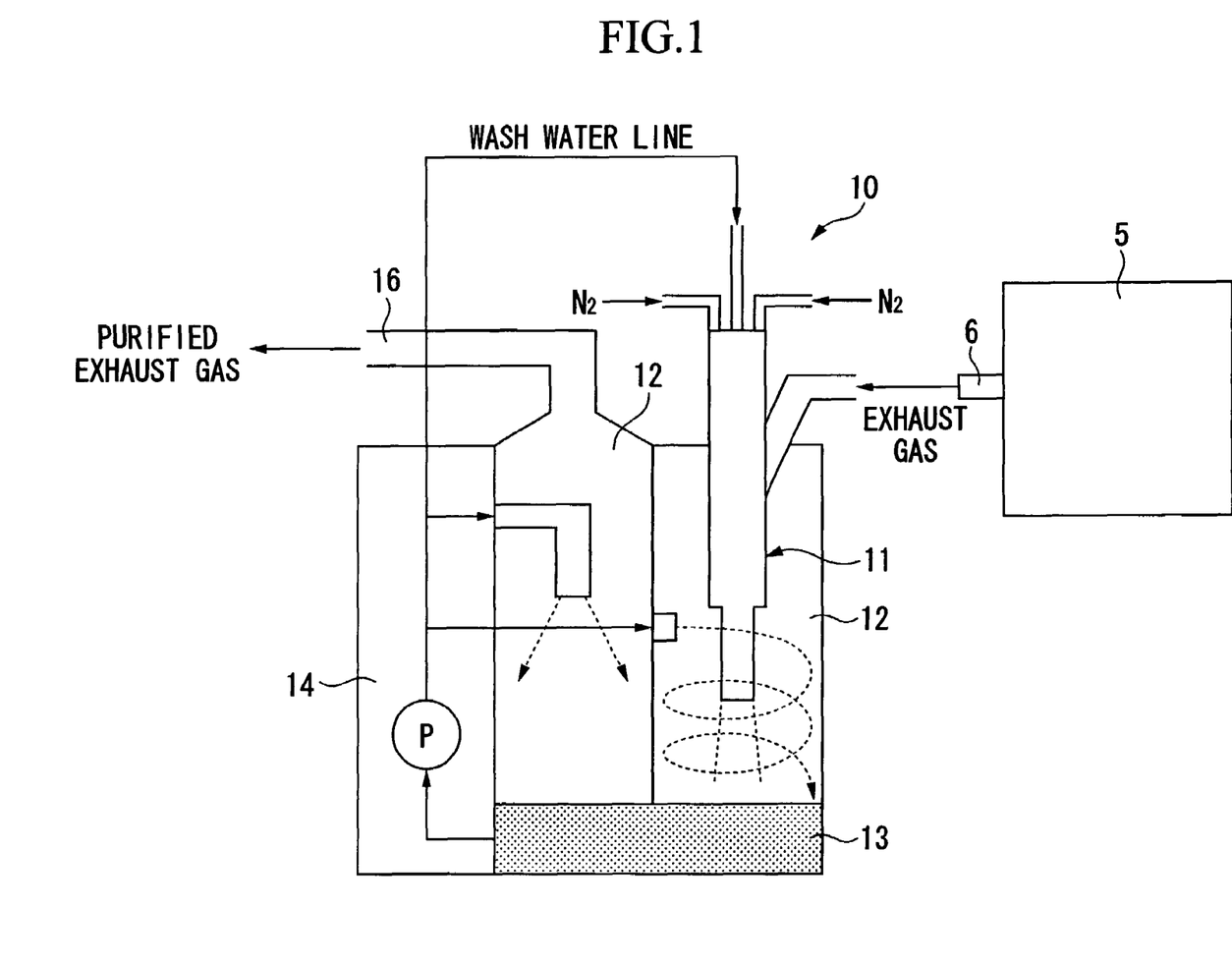
FIG. 1 is a explanatory view showing an exhaust gas scrubber of the present invention.

Embodiments of the present invention are described below in conjunction with the attached figures. FIG. 1 is an explanatory view showing an outline of an exhaust gas scrubber for an epitaxial wafer manufacturing device of the present invention. An exhaust gas scrubber 10 is connected to an exhaust tube 6 which discharges exhaust gas including a gas used for a crystal growth process in an epitaxial wafer manufacturing device 5, for example $SiHCl_3$ components. The exhaust gas scrubber 10 mainly includes an exhaust gas scrubber tube 11, a scrubber chamber 12, a wash water pool 13 and a wash water circulator 14.

The exhaust gas discharged from the exhaust tube 6 of the epitaxial wafer manufacturing device 5 is first introduced into the exhaust gas scrubber tube 11. And then, in the scrubber chamber 12, the exhaust gas is exposed to wash water, for example water, which is supplied from the wash water circulator 14. As a result of exposure of the exhaust gas to the wash water, most of the exhaust gas components are removed, and the exhaust gas is purified. The gas which is treated to have almost the same components as air is then released into the atmosphere from an exhaust tube 16.

The wash water circulator 14 pumps up the wash water collected in the wash water pool 13, supplies the wash water to this scrubber chamber 12 and the below-mentioned exhaust gas scrubber tube 11, and sprays mist-like wash water into the scrubber chamber 12. Thereby the wash water circulator 14 conducts a function of exposing the exhaust gas to the wash water. Examples of the wash water includes water such as industrial-use water and the like, and water containing absorbents of specified components and the like, and there are no particular restrictions on the wash water.

Figure 2:
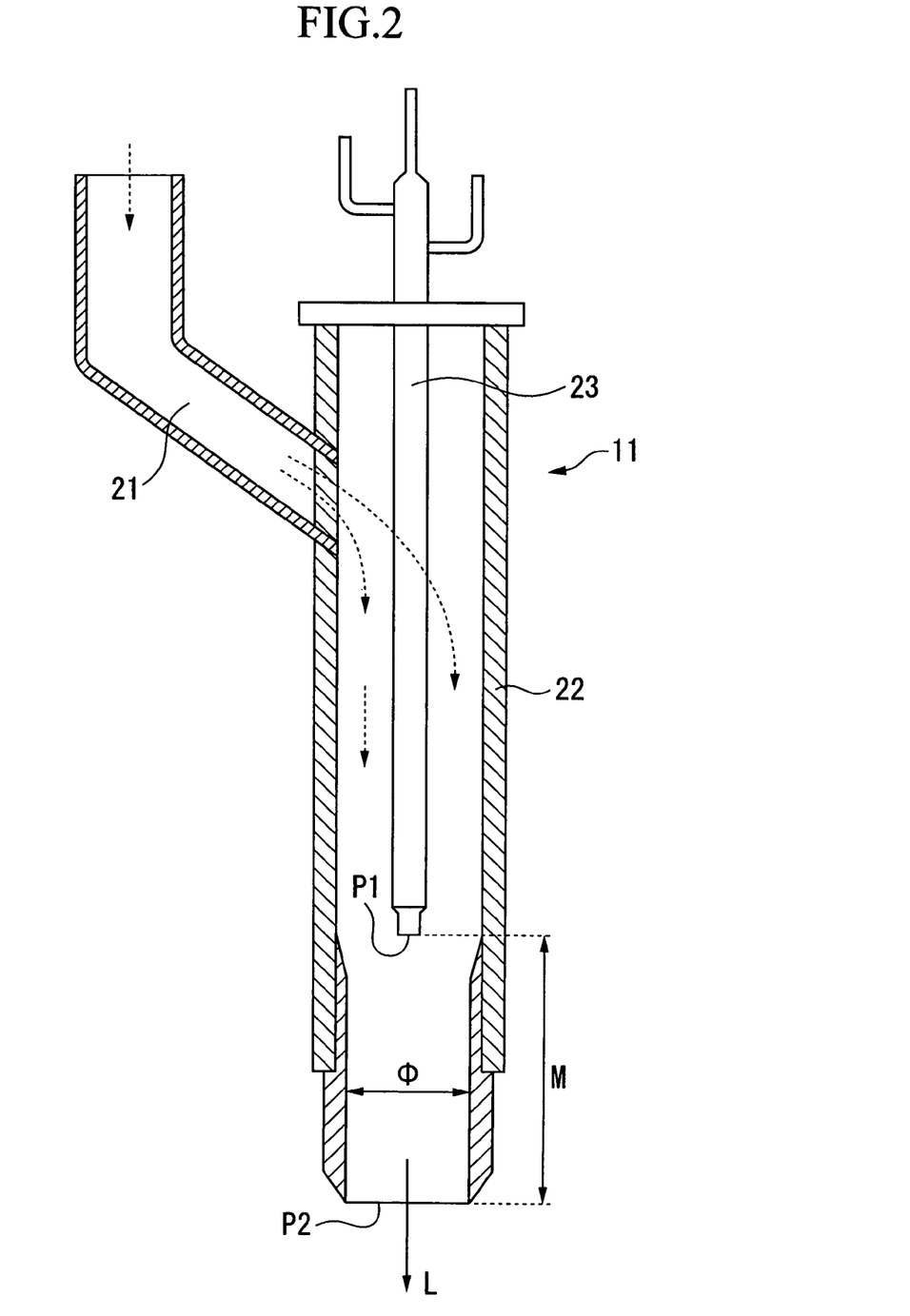
FIG. 2 is a sectional view showing a structure of a scrubber inlet tube.

FIG. 2 is a sectional view showing a structure of the exhaust gas scrubber tube 11 formed in the scrubber chamber 12. The exhaust gas scrubber tube 11 includes a scrubber inlet tube 22 provided with an injection tube 21 for introducing the exhaust gas discharged from the exhaust tube 6 of the epitaxial wafer manufacturing device 5, and a washing tube unit 23 formed inside this scrubber inlet tube 22. The scrubber inlet tube 22 is, for example, a tube which has a bore diameter φ of 50 mm and is formed entirely of metal, and exhaust gas containing $SiHCl_3$ components which is introduced from the injection tube 21 into an interior of the scrubber inlet tube 22 flows in a longitudinal direction L of the wash tube unit 23.

Figure 3:
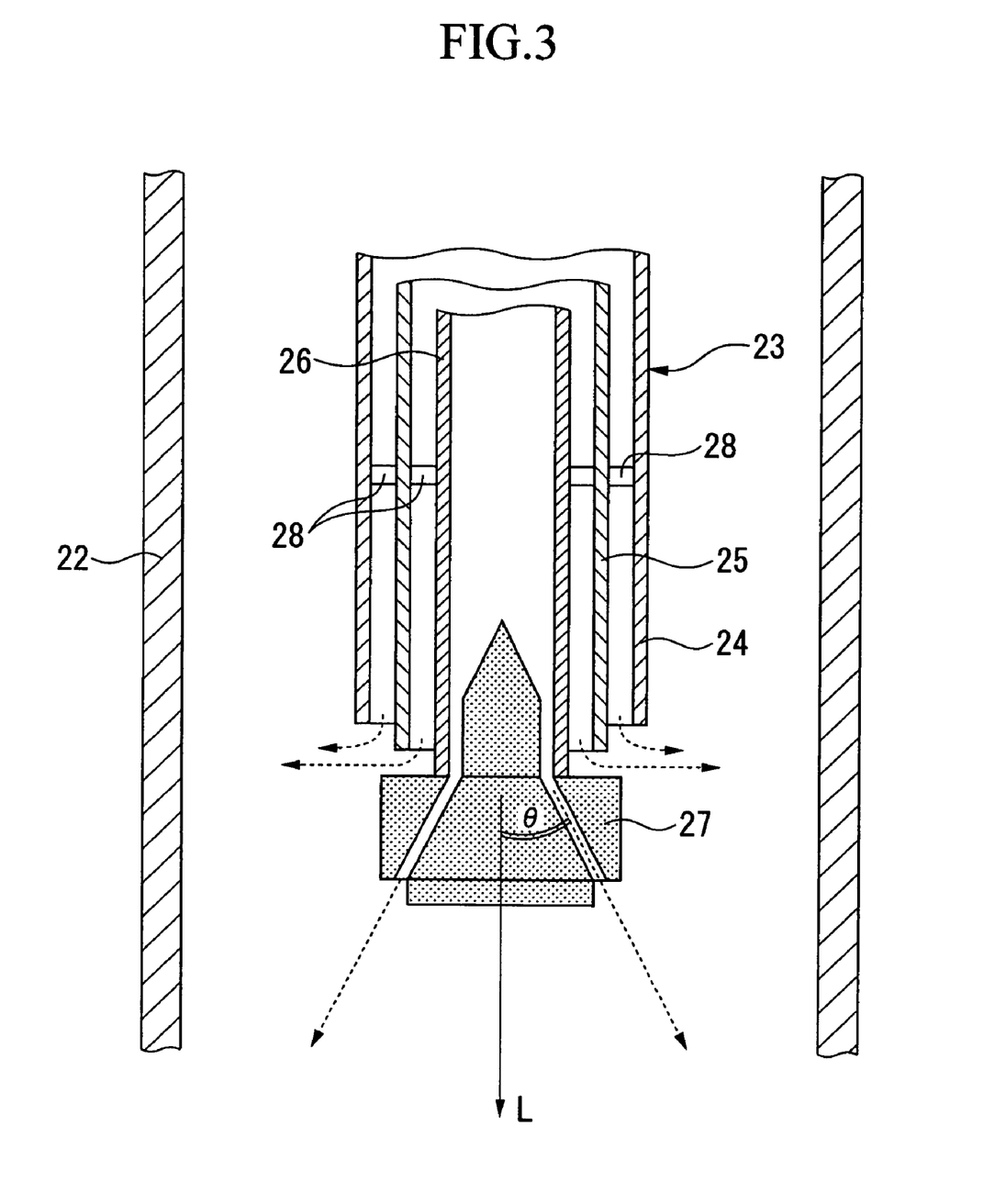
FIG. 3 is a sectional view showing a structure of a wash tube unit.

As shown in FIG. 3, the wash tube unit 23 formed in this scrubber inlet tube 22 includes a triple-tube structure consisting of an outer tube 24 which provides a constant flow of inert gas so as to seal a tip of the wash tube unit 23, a middle tube 25 which is formed inside this outer tube 24 and provides a flow of inert gas only when operating the wash tube unit 23, and an inner tube 26 which is formed inside this middle tube 25 and provides alternate flow of wash water and inert gas for the purposes of removing deposits.

An outflow control plug 27 is attached to a tip of the inner tube 26 for controlling a spray angle of the wash water flowing out of the inner tube 26, and for controlling a spray direction of the inert gas flowing out of the outer tube 24 and the middle tube 25. This outflow control plug 27 provides controls the wash water flowing out of the inner tube 26 to be sprayed toward an inner wall of the scrubber inlet tube 22 at an angle θ of 15 to 25° relative to a longitudinal direction L of the wash tube unit 23.

Moreover, the outflow control plug 27 controls the inert gas, for example nitrogen gas, flowing through the outer tube 24 and the middle tube 25 to make a nearly right-angled turn and strike the inner wall of the scrubber inlet tube 22 at a right angle.

Mutual positions of the outer tube 24, the middle tube 25 and the inner tube 26 configuring the wash tube unit 23 are fixed by joints 28 which prevent variation in their mutual installation spacing. These joints 28 prevent changes in mutual positions caused by vibrations which occur when the wash water and the inert gas intermittently flow in the wash tube unit 23, thereby variations in flow rate are prevented.

The wash tube unit 23 with this configuration may be installed so that a foremost position P1 is set back toward an interior from a foremost position P2 of the scrubber inlet tube 22 only by a distance M. It is preferable to set the distance M to, for example, 115 mm or more in the case in which the scrubber inlet tube 22 is formed to have a bore diameter φ of 50 mm.

Next, operations of the exhaust gas scrubber provided with an exhaust gas scrubber tube having this type of configuration are explained focusing on effects of the wash tube unit. Exhaust gas containing $SiHCl_3$ components discharged from the exhaust tube 6 of the epitaxial wafer manufacturing device 5 shown in FIG. 1 is introduced into the scrubber inlet tube 22 through the injection tube 21, and flows in the longitudinal direction L of the wash tube unit 23 shown in FIG. 2.

Figure 4:
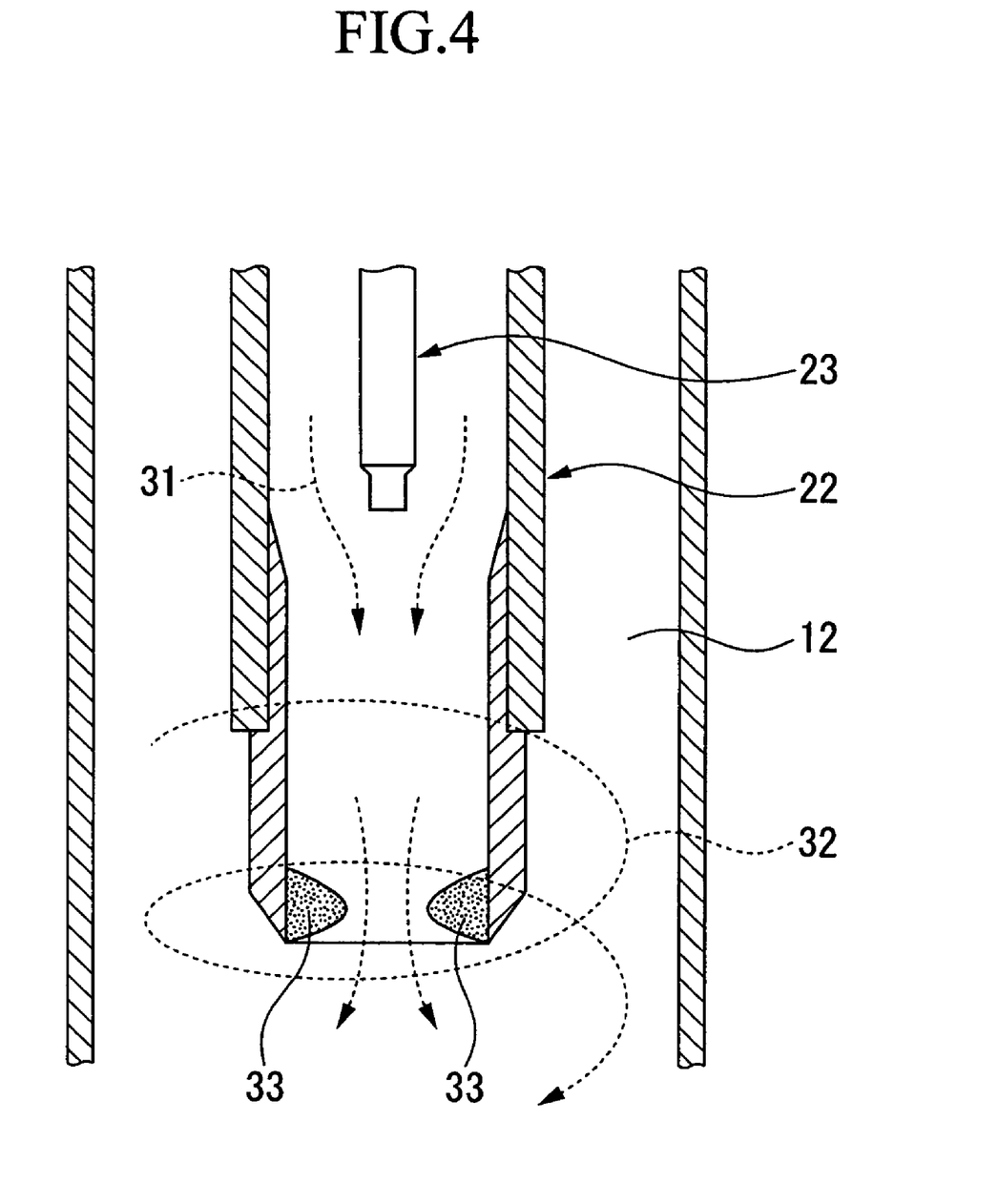
FIG. 4 is a sectional view showing an operation of the exhaust gas scrubber of the present invention.

On the other hand, wash water is sprayed in the scrubber chamber 12 shown in FIG. 1, and the exhaust gas containing $SiHCl_3$ components flowing through the scrubber inlet tube 22 contacts the wash water, and is purified. In this process, when the $SiHCl_3$ components of the exhaust gas contact the wash water, a chemical reaction is caused to produce silicon oxide ($SiO_x$). As shown in FIG. 4, $SiO_x$ deposits 33 produced by the contact of the exhaust gas 31 with the wash water 32 accumulate at or in a vicinity of an outlet of the scrubber inlet tube 22.

When these $SiO_x$ deposits 33 produced by the contact of the exhaust gas 31 with the wash water 32 accumulate at or in the vicinity of the outlet of the scrubber inlet tube 22, a diameter of the outlet of the scrubber inlet tube 22 narrows or the outlet is clogged, thereby efficiency of an exhaust gas scrubber treatment is degraded. Therefore, it is necessary to quickly remove these $SiO_x$ deposits 33. Conventionally, these $SiO_x$ deposits are, for example, manually scraped off using a rod or the like; however there have been safety concerns because some substances among the $SiO_x$ have a property of igniting due to friction and static electricity. Moreover, in the case in which these $SiO_x$ deposits are manually scraped off, the $SiO_x$ deposits are reattached to the scraping rod. As a result, it is necessary to open a portion of the scrubber inlet to clean, thereby the epitaxial wafer manufacturing device must be stopped for a considerable time, and productivity is impeded.

In the exhaust gas scrubber 10 of the present invention, it is possible to regularly and automatically remove these $SiO_x$ deposits 33 using the wash tube unit 23 formed inside the scrubber inlet tube 22. Specifically, for example, a process for removing the $SiO_x$ deposits 33 (scrubber inlet tube cleaning) is conducted using the time during which the epitaxial wafer manufacturing device 5 performs an etching reaction process which precedes a start of an epitaxial growth process.

Figure 5:
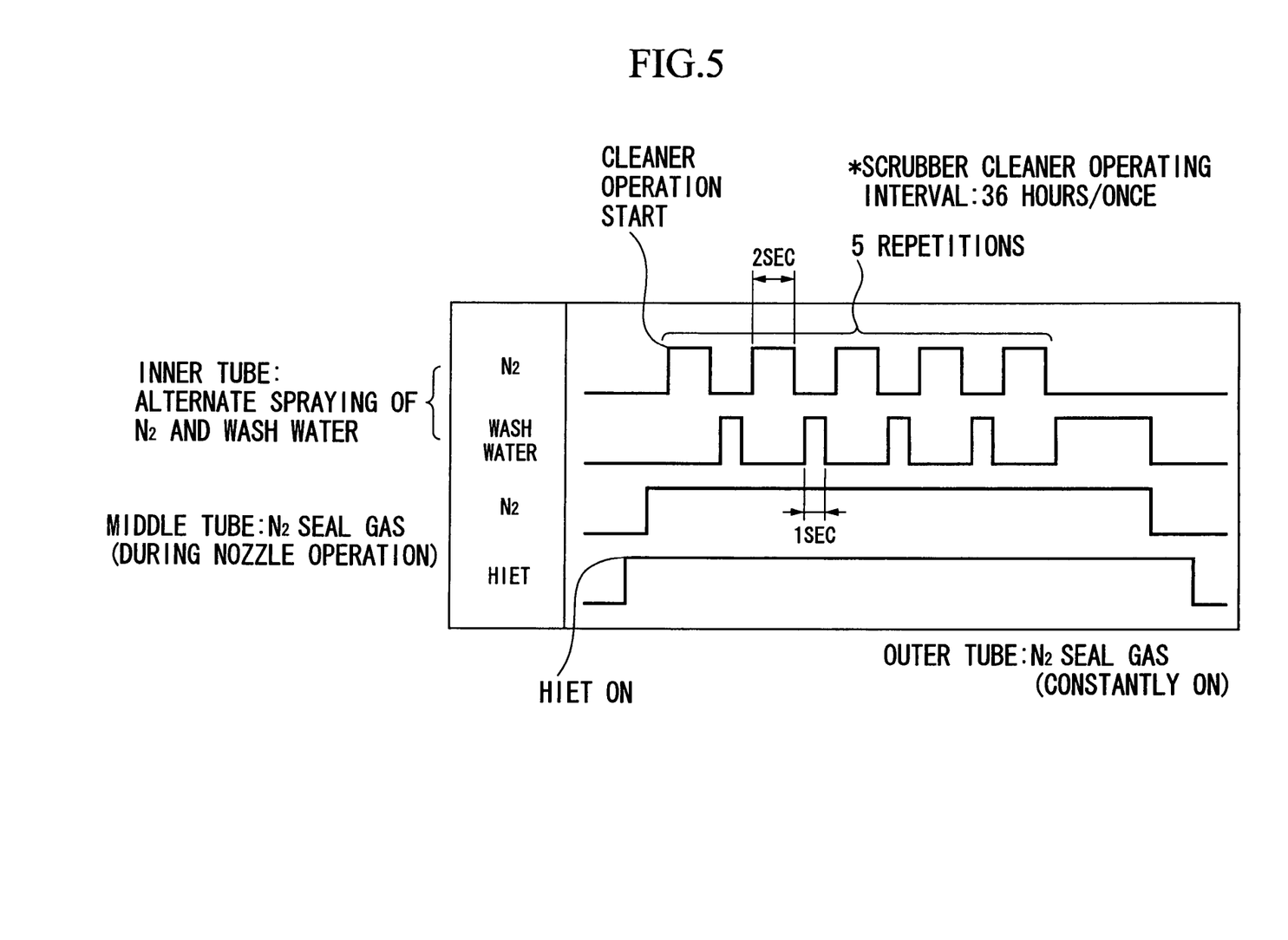
FIG. 5 is a timing chart showing one example of operations of each tube configuring the wash tube unit in a cleaning mode.

A timing chart in FIG. 5 shows one example of operations of each of the tubes configuring the wash tube unit 23 during a process of removing the $SiO_x$ deposits 33 (cleaning mode)

in the exhaust gas scrubber 10 of the present invention. When the epitaxial wafer manufacturing device 5 starts the etching reaction process (HIET), HIET signals are inputted from the epitaxial wafer manufacturing device 5 to a control device (not illustrated) of the exhaust gas scrubber 10. When the HIET signals are set to ON, the exhaust gas scrubber 10 starts a deposit cleaning mode.

In this cleaning mode, nitrogen gas and wash water are alternately sprayed toward the scrubber inlet tube 22 from the inner tube 26 of the wash tube unit 23. For example, a cycle is repeated five times in which from the inner tube 26, the nitrogen gas is sprayed for two seconds and then the wash water is sprayed for one second. The nitrogen gas and the wash water are sprayed, for example, at an angle of 20 degrees toward the inner wall of the scrubber inlet tube 22.

Moreover, from the middle tube 25, the nitrogen gas is sprayed toward the scrubber inlet tube 22 only during this cleaning mode. The nitrogen gas sprayed from this middle tube 25 may, for example, have a flow rate of 5 to 60 liters/minute. From the outer tube 24, as a seal gas, the nitrogen gas having a constant flow rate of 10 liters/minute is continuously sprayed toward the scrubber inlet tube 22 at all times, not only during HIET.

Figure 6:
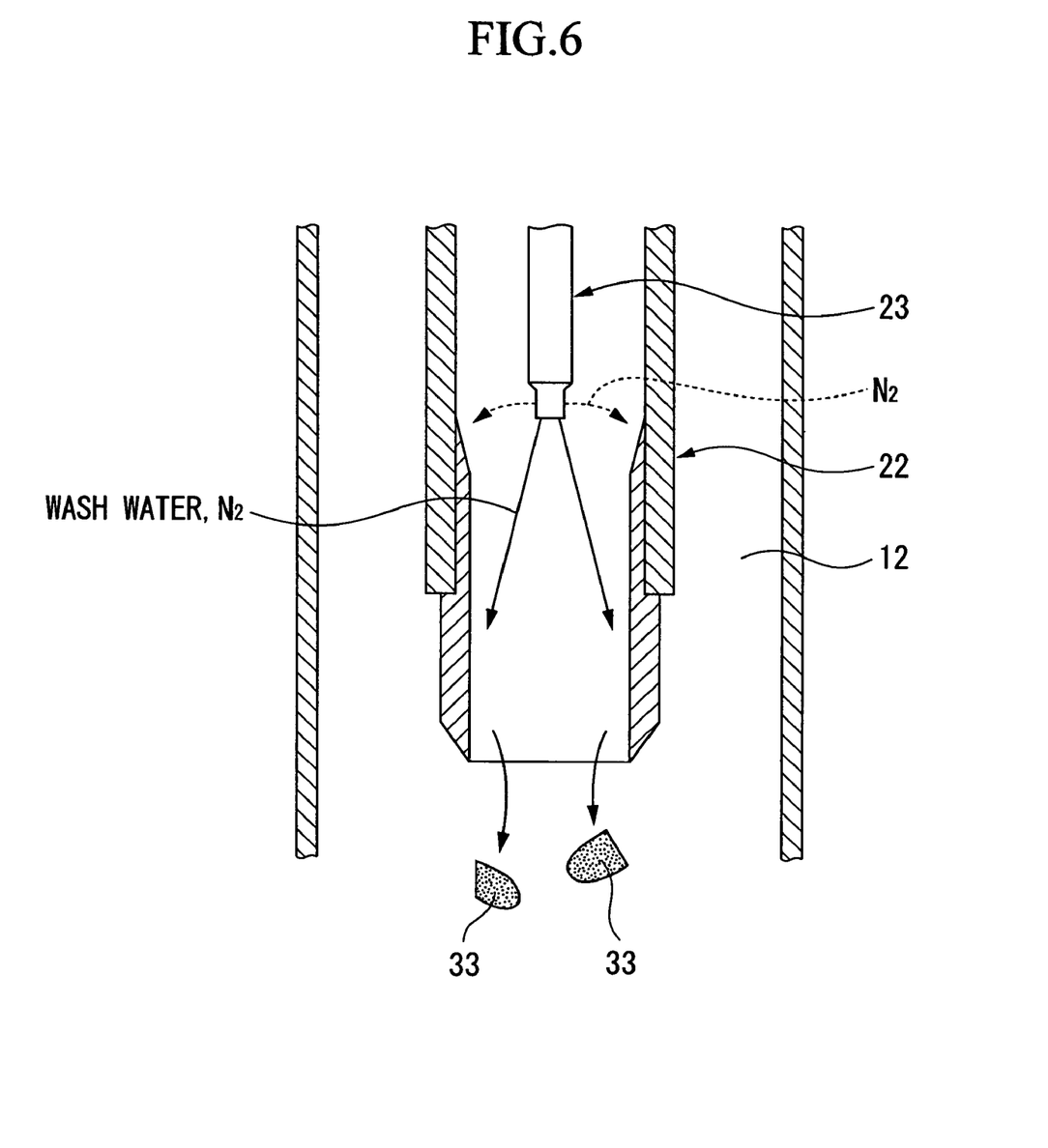
FIG. 6 is a sectional view showing an operation of the exhaust gas scrubber of the present invention.

As shown in FIG. 6, nitrogen gas and wash water are sprayed toward the inner wall of the scrubber inlet tube 22 from the triple-structure wash tube unit 23, thereby the $SiO_x$ deposits 33 accumulated at or in the vicinity of the end of the scrubber inlet tube 22 are removed. As a result of automatic removal of the $SiO_x$ deposits 33 before the epitaxial wafer manufacturing device 5 starts the epitaxial growth process, an excessive accumulation of deposits is prevented in the scrubber inlet tube 22 of the exhaust gas scrubber 10, thereby a degradation in exhaust-gas purifying performance can be prevented.

Moreover, by regularly and automatically conducting the cleaning of this scrubber inlet tube 22 during the etching reaction process (HIET) of the epitaxial wafer manufacturing device 5, it becomes possible to safely remove the $SiO_x$ deposits 33 without reducing the productivity of the epitaxial wafer manufacturing device 5.

Here, in this embodiment, the wash tube unit 23 was configured with 3 tubes; however other configurations are also possible provided that the configuration includes, in a tip of a wash unit, an inner nozzle which alternately sprays the wash water and inert gas at the aforementioned spray angle for removal of deposits, a middle nozzle which flows inert gas only during operating the wash unit from a rear side of a spray tip of the inner nozzle around the entire periphery of the nozzle so that the inert gas flows approximately perpendicular to an axis of the nozzle, and an outer nozzle which constantly flows the inert gas from a rear side of a spray tip of the middle nozzle for the purposes of sealing the inner nozzle and the middle nozzle.

By this means, a nozzle tip is constantly protected from the exhaust gas by a first seal gas from the outer nozzle. Furthermore, a second seal gas from the middle nozzle prevents an adhesion of deposits in the nozzle tip which are produced by a reaction of the exhaust gas with the wash water in the nozzle tip during operating the nozzle. While protecting the nozzle tip and preventing the adhesion of the deposits using the first and second seal gases, deposits adhered to an outlet of the scrubber inlet tube can be removed safely at a specified frequency. Thereby, safety and work efficiency of an exhaust gas purifying treatment in the epitaxial wafer manufacturing device can be improved.

EXAMPLE

The inventors of the present invention verified changes in a suction pressure with time which increase as deposits increase in the scrubber inlet tube of the exhaust gas scrubber of the present invention. With regard to the verification, the exhaust gas scrubber of the present invention having cleaning functions as in the above-described embodiment, and a conventional exhaust gas scrubber without the cleaning functions for this scrubber inlet tube were used, a prescribed amount of exhaust gas was made to continuously flow through each of the exhaust gas scrubbers, and variations in the suction pressure were measured.

Figure 7:
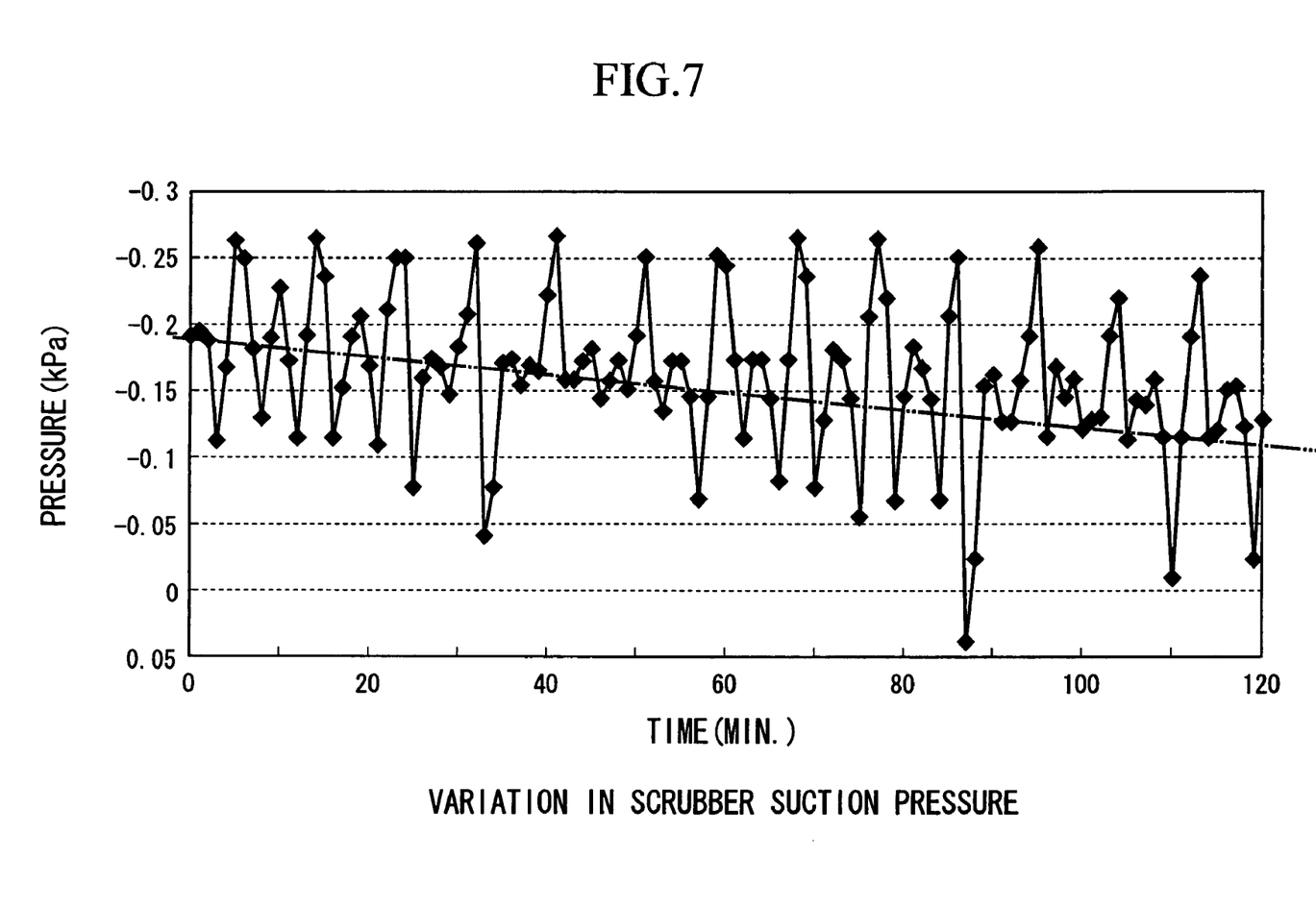
FIG. 7 is a graph showing verification results of a comparative example.
Figure 8:
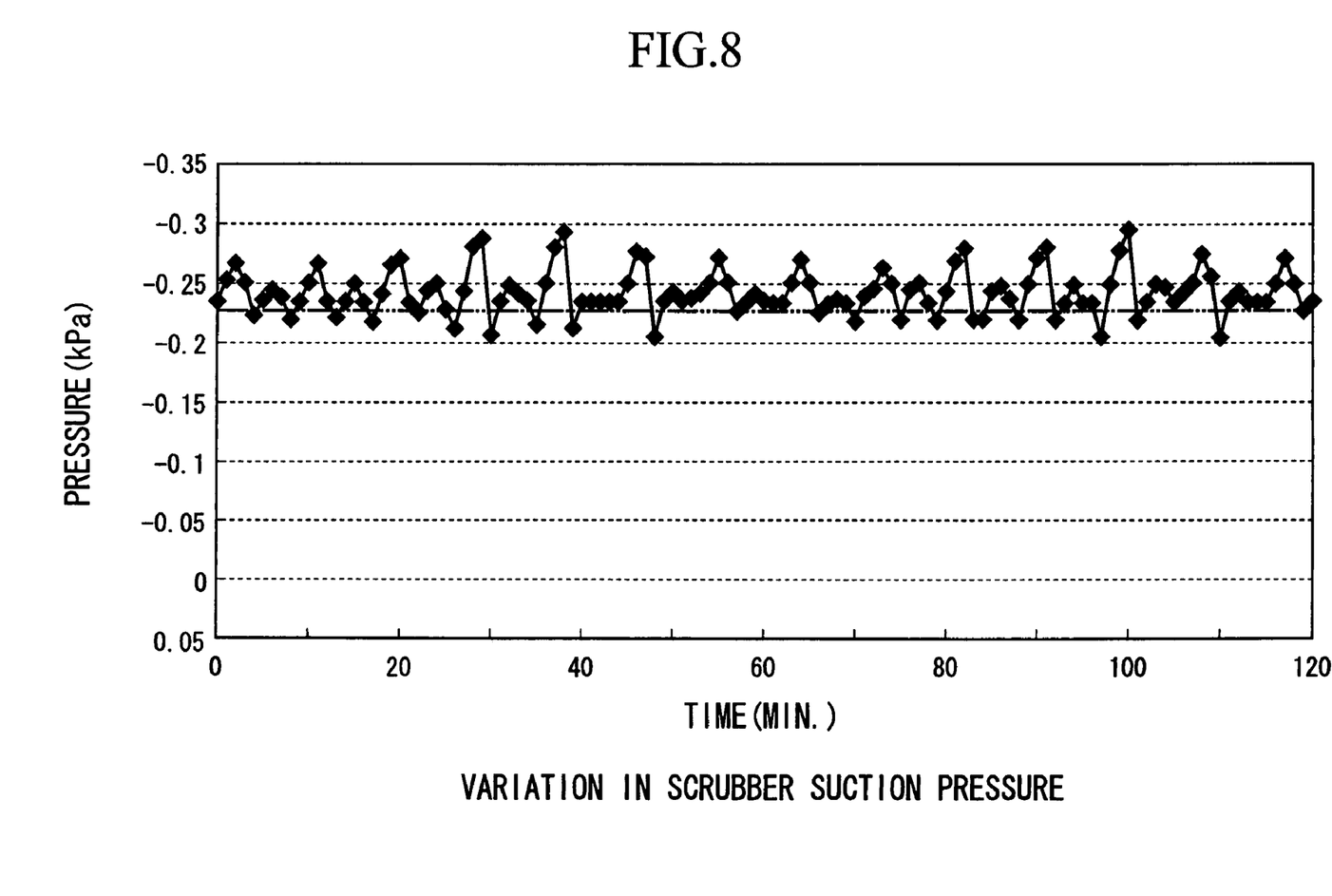
FIG. 8 is a graph showing verification results of the present invention.

Regarding results of this verification, a comparative example using the conventional exhaust gas scrubber is shown in FIG. 7, and an example of the present invention using the exhaust gas scrubber of the present invention is shown in FIG. 8. According to FIG. 7 and FIG. 8, in the exhaust gas scrubber of the comparative example, a range of variation in the suction pressure was very large, and the suction pressure gradually decreased over time. When the scrubber inlet tube is in a clogged state, the suction pressure declines, and variations in the suction pressure also increase. On the other hand, in the exhaust gas scrubber of the present invention, a range of variation in the suction pressure was small, and the suction pressure was constant and did not decline over time. From these results, in the exhaust gas scrubber of the present invention, it was confirmed that a capacity for treating the exhaust gas was constantly maintained at a fixed level, and that purifying exhaust gas could be efficiently performed.

What is claimed is:

1. An exhaust gas scrubber for an epitaxial wafer manufacturing device, comprising:
   a scrubber inlet tube configured to introduce an exhaust gas discharged from an epitaxial wafer manufacturing device; and
   a wash tube unit formed inside said scrubber inlet tube configured to spray wash water toward an interior of said scrubber inlet tube from one end thereof so as to wash adhesions inside said scrubber inlet tube,
   wherein said wash tube unit comprises:
      an outer tube arranged to allow inert gas constantly flows,
      a middle tube which is formed inside said outer tube and arranged to allow inert gas intermittently flows,
      an inner tube which is formed inside said middle tube and arranged to allow said wash water and inert gas alternately flow, and
      a nozzle tip which is provided on an end of said inert gas flowing through said inner tube,
      wherein said nozzle tip comprises:
         an inner nozzle configured to spray said wash water and said inert gas flowing through said inner tube,
         a middle nozzle configured to spray said inert gas flowing through said middle tube from a rear side of said inner nozzle radially and approximately perpendicular to a central axis along the direction of said wash tube unit, and
         an outer nozzle is provided on said outer tube configured to spray said inert gas flowing through said outer tube around said nozzle tip.

2. The exhaust gas scrubber for an epitaxial wafer manufacturing device according to claim 1, wherein joints are further formed in said outer tube, said middle tube and said inner tube configuring said wash tube unit so as to prevent variation in their mutual installation spacing.

3. The exhaust gas scrubber for an epitaxial wafer manufacturing device according to claim 1, wherein said wash tube unit sprays said wash water toward said interior of said scrubber inlet tube at an angular range of 15 to 25° relative to a longitudinal direction thereof.

4. The exhaust gas scrubber for an epitaxial wafer manufacturing device according to claim 2, wherein said wash tube unit sprays said wash water toward said interior of said scrubber inlet tube at an angular range of 15 to 25° relative to a longitudinal direction thereof.

* * * * *